United States Patent
Galford (10) Patent No.: US 11,143,785 B2
(45) Date of Patent: Oct. 12, 2021

(54) TEMPERATURE COMPENSATED SENSOR GAIN CALIBRATION

(71) Applicant: HALLIBURTON ENERGY SERVICES, INC., Houston, TX (US)

(72) Inventor: James E. Galford, Missouri City, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/863,577

(22) Filed: Apr. 30, 2020

(65) Prior Publication Data
US 2021/0096274 A1   Apr. 1, 2021

Related U.S. Application Data

(60) Provisional application No. 62/907,265, filed on Sep. 27, 2019.

(51) Int. Cl.
| | | |
|---|---|---|
| *G01V 5/12* | (2006.01) | |
| *G01V 5/06* | (2006.01) | |
| *G01T 1/202* | (2006.01) | |

(52) U.S. Cl.
CPC . *G01V 5/12* (2013.01); *G01V 5/06* (2013.01)

(58) Field of Classification Search
CPC . G01V 5/12; G01V 5/101; G01V 5/10; G01V 5/06; G01T 1/202; E21B 47/07
See application file for complete search history.

(56) References Cited

U.S. PATENT DOCUMENTS

| | | | |
|---|---|---|---|
| 7,202,456 B2 | 4/2007 | Mickael | |
| 7,253,401 B2 | 8/2007 | Mickael et al. | |
| 9,933,532 B2 | 4/2018 | Moake | |
| 10,429,544 B2 * | 10/2019 | Moake | G01V 5/06 |
| 10,816,695 B1 * | 10/2020 | Vehra | G01T 1/40 |
| 2005/0199794 A1 | 9/2005 | Mickael | |
| 2011/0192979 A1 | 8/2011 | Cahill | |
| 2016/0077224 A1 | 3/2016 | Moake | |
| 2017/0248737 A1 | 8/2017 | Moake | |

FOREIGN PATENT DOCUMENTS

WO    2013078263 A1    5/2013

OTHER PUBLICATIONS

International Search Report, Response & Written Opinion, PCT Application No. PCT/US2020/037380, dated Sep. 10, 2020.

\* cited by examiner

*Primary Examiner* — David P Porta
*Assistant Examiner* — Fani Boosalis
(74) *Attorney, Agent, or Firm* — Polsinelli PC (57) ABSTRACT

Aspects of the subject technology relate to a system configured to apply a voltage setting to a sensor of a downhole tool. The system is configured to identify an active gain control model for a temperature-sensitive sensor for a downhole tool, receiving temperature data for the downhole tool, and apply a high voltage setting for the first sensor based on the temperature data and the active gain control model. The system is further configured to collect sensor data from the sensor operating in a wellbore using the high voltage setting and update the active gain control model based on the sensor data.

20 Claims, 10 Drawing Sheets

TEMPERATURE COMPENSATED SENSOR GAIN CALIBRATION

FIELD

The present disclosure relates generally to sensors used in a wellbore system and, in particular, to calibrating sensors used in the wellbore system.

BACKGROUND

Wellbores are drilled into the earth for a variety of purposes including accessing hydrocarbon bearing formations. Downhole tools can be used within a wellbore in connection with accessing and extracting such hydrocarbons. The downhole tools may include a variety of sensors that can measure and record various sensor data related to the formation and/or wellbore. These sensors are subjected to extreme conditions including high temperatures that fluctuate over time and/or distance (e.g., depth). Some sensors used on downhole tools are temperature sensitive and the signal strength detected by a sensor may be affected by the temperature of the sensors. These sensors may also be sensitive to the voltage applied to the sensors and gain control systems may be used to adjust the amount of voltage applied to a sensor and may be used to compensate for the effects of temperature on the sensor.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts can be exaggerated to better illustrate details and features of the present disclosure.

Some sensors on downhole tools may be affected by the temperature of the sensors. Gain control systems may be used to set a high voltage that compensates for the effects of temperature on the sensors. However, this typically requires a lengthy process that includes collecting and analyzing a large amount of sensor output under stable conditions. Unfortunately, in the wellbore environment where downhole tools operate, temperatures may have wide ranges and fluctuate quickly.

Aspects of the subject technology relate to providing a more responsive gain control system for temperature sensitive sensors. One example category of temperature sensitive sensors includes a gamma ray spectroscopy detector and various aspects of the subject technology are discussed with respect to gamma ray spectroscopy detectors for illustrative purposes. However, other types of sensors may also be used. Furthermore, some aspects of the subject technology may be discussed with respect to downhole tools used in logging while drilling (LWD) applications. However, as will be discussed in further detail, other types of environments including measurement while drilling (MWD) or wireline wellbore environments are similarly applicable.

Figure 1A:
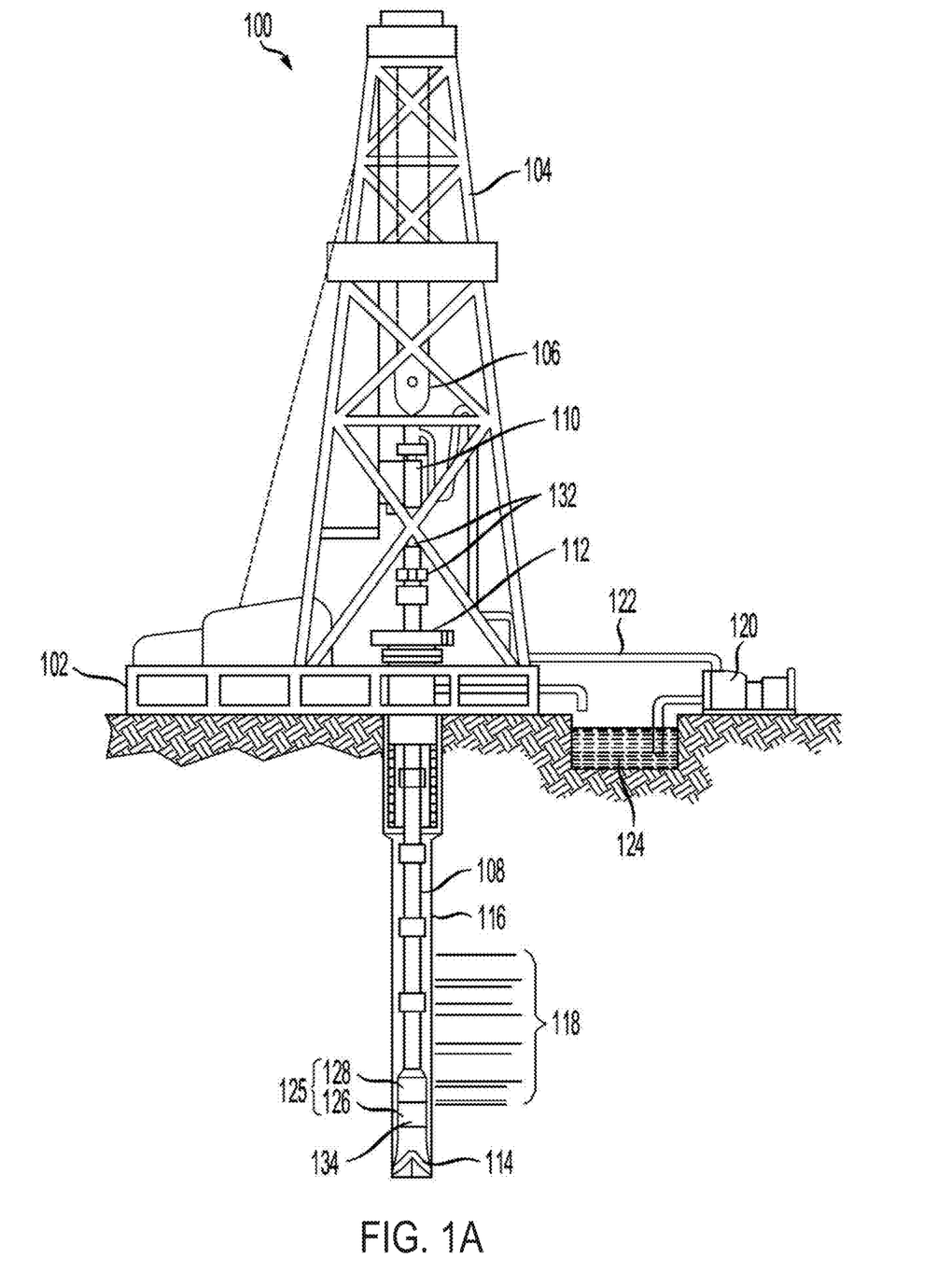
FIGS. 1A and 1B are diagrams illustrating examples of downhole environments in which a gain control system can be used, in accordance with various aspects of the subject technology.

Referring to FIG. 1A, a diagrammatic view illustrates an exemplary wellbore drilling environment 100, for example a logging while drilling (LWD) and/or measurement while drilling (MWD) wellbore environment, in which the present disclosure can be implemented. As illustrated in FIG. 1A, a drilling platform 102 is equipped with a derrick 104 that supports a hoist 106 for raising and lowering one or more drilling components 132 which can include, for example, a drill string 108 which can include one or more drill collars 134, a drill bit 114, and/or a bottom-hole assembly 125. The drilling components 132 are operable to drill a wellbore 116. The drilling components 132 also can include housings for one or more downhole tools. The drilling components 132 can be manufactured from one or more materials including, but not limited to, steel, stainless steel, an alloy, or the like. The material can also be magnetic or non-magnetic.

The hoist 106 suspends a top drive 110 suitable for rotating the drill string 108 and lowering the drill string 108 through a well head 112. Connected to the lower end of the drill string 108 is a drill bit 114. As the drill bit 114 rotates, the drill bit 114 creates a wellbore 116 that passes through various formations 118. A pump 120 circulates drilling fluid through a supply pipe 122 to the top drive 110, down through the interior of the drill string 108, through orifices in the drill bit 114, back to the surface via the annulus around the drill string 108, and into a retention pit 124. The drilling fluid transports cuttings from the wellbore 116 into the pit 124 and aids in maintaining the integrity of the wellbore 116. Various materials can be used for drilling fluid, including oil-based fluids and water-based fluids.

As illustrated in FIG. 1A, sensors 126 can be provided, for example integrated into the bottom-hole assembly 125 near the drill bit 114. The sensors 126, in another example, can be integrated into a drill collar of a pressure sleeve system. As the drill bit 114 extends the wellbore 116 through the formations 118, the sensors 126 can collect measurements of various drilling parameters, for example relating to various formation properties, the orientation of the drilling component(s) 132, dog leg severity, pressure, temperature, weight on bit, torque on bit, and/or rotations per minute. The sensors 126 can be any suitable sensor to measure the drilling parameters, for example transducers, fiber optic sensors, and/or surface and/or downhole sensors. The bottom-hole assembly 125 can also include a telemetry sub 128 to transfer measurement data to a surface receiver and to receive commands from the surface (not illustrated). In some examples, the telemetry sub 128 communicates with a surface receiver 130 using mud pulse telemetry. In other examples, the telemetry sub 128 does not communicate with the surface, but rather stores logging data for later retrieval at the surface when the logging assembly is recovered. Notably, one or more of the bottom-hole assembly 125, the sensors 126, and the telemetry sub 128 can also operate using a non-conductive cable (e.g. slickline, etc.) with a local power supply, such as batteries and the like. When employing non-conductive cable, communication can be supported using, for example, wireless protocols (e.g. EM, acoustic, etc.) and/or measurements and logging data can be stored in local memory for subsequent retrieval at the surface.

Each of the sensors 126 can include a plurality of tool components, spaced apart from each other, and communicatively coupled together with one or more wires. The telemetry sub 128 can include wireless telemetry or logging capabilities, or both, such as to transmit information in real time indicative of actual downhole drilling parameters to operators on the surface.

The sensors 126, for example an gamma ray logging tool, can also include one or more computing devices (not illustrated) communicatively coupled with one or more of the plurality of drilling components 132. The computing devices can be configured to control or monitor the performance of the sensors 126, process logging data, and/or carry out the methods of the present disclosure.

In some examples, one or more of the sensors 126 can communicate with the surface receiver, such as a wired drill pipe. In other cases, the one or more of the sensors 126 can communicate with the surface receiver by wireless signal transmission. In at least some cases, one or more of the sensors 126 can receive electrical power from a wire that extends to the surface, including wires extending through a wired drill pipe. In at least some examples the methods and techniques of the present disclosure can be performed by a controller, for example a computing device, on the surface. In some examples, the controller can be included in and/or communicatively coupled with surface receiver. For example, the surface receiver of wellbore operating environment 100 at the surface can include one or more of wireless telemetry, processor circuitry, or memory facilities, such as to support substantially real-time processing of data received from one or more of the sensors 126. In some examples, data can be processed at some time subsequent to its collection, wherein the data can be stored on the surface at surface receiver, stored downhole in telemetry sub 128, or both, until it is retrieved for processing.

Figure 1B:
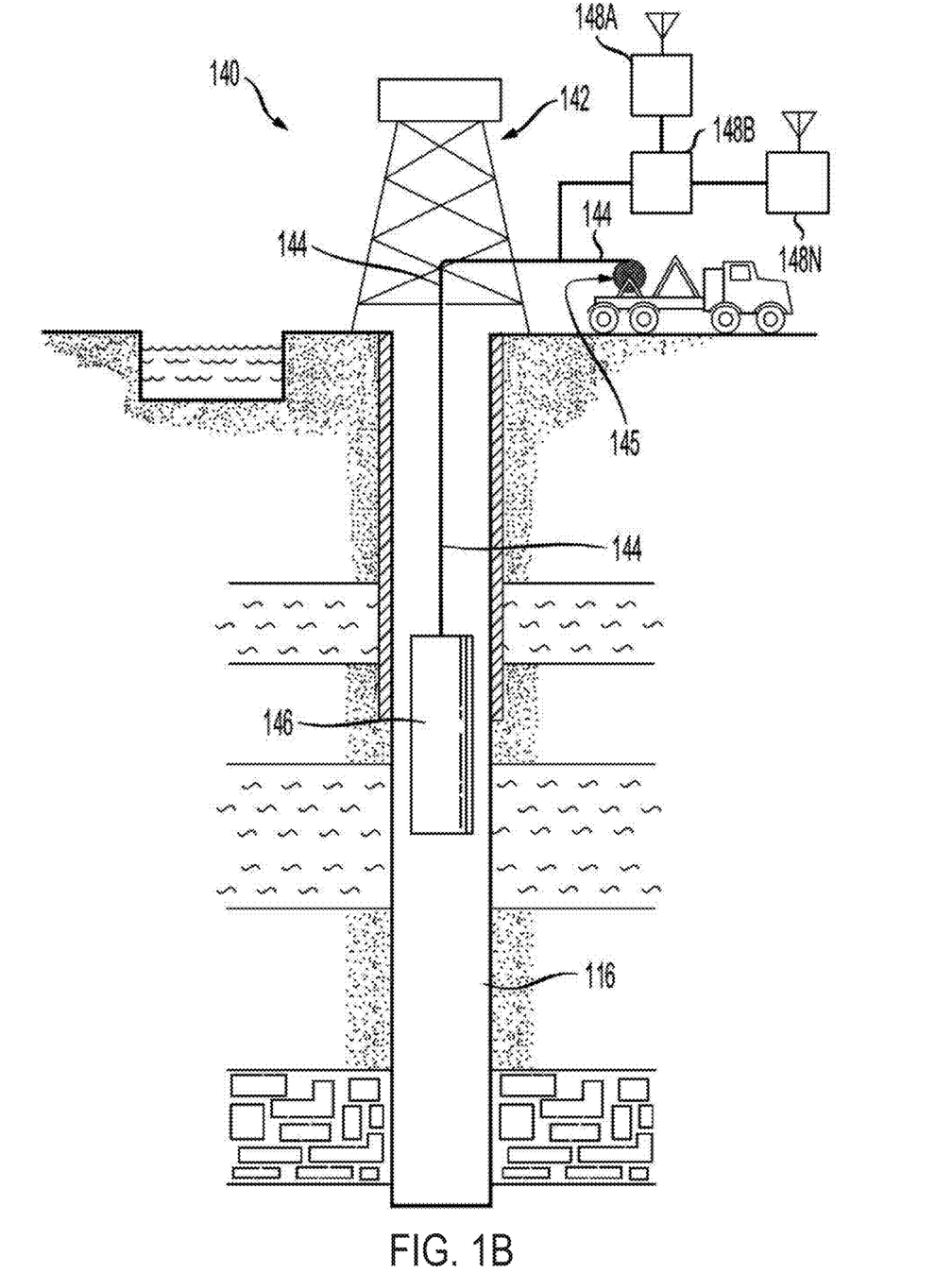

Referring to FIG. 1B, an example system 140 for downhole wireline measurements in a downhole environment can employ a tool having a tool body 146 in order to carry out logging and/or other operations. For example, instead of using the drill string 108 of FIG. 1A to lower tool body 146, which may contain sensors or other instrumentation for detecting and logging nearby characteristics and conditions of the wellbore 116 and surrounding formation, a wireline conveyance 144 can be used. The tool body 146 can include a gamma ray logging tool. The tool body 146 can be lowered into the wellbore 116 by wireline conveyance 144. The wireline conveyance 144 can be anchored in a drill rig 145 or a portable means such as a truck. The wireline conveyance 144 can include one or more wires, slicklines, cables, and/or the like, as well as tubular conveyances such as coiled tubing, joint tubing, or other tubulars.

The illustrated wireline conveyance 144 provides support for the tool, as well as enabling communication between tool processors 148A-N on the surface and providing a power supply. In some examples, the wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more processors 148A-N, which can include local and/or remote processors. Moreover, power can be supplied via the wireline conveyance 144 to meet power requirements of the tool. For slickline or coiled tubing configurations, power can be supplied downhole with a battery or via a downhole generator.

Figure 2:
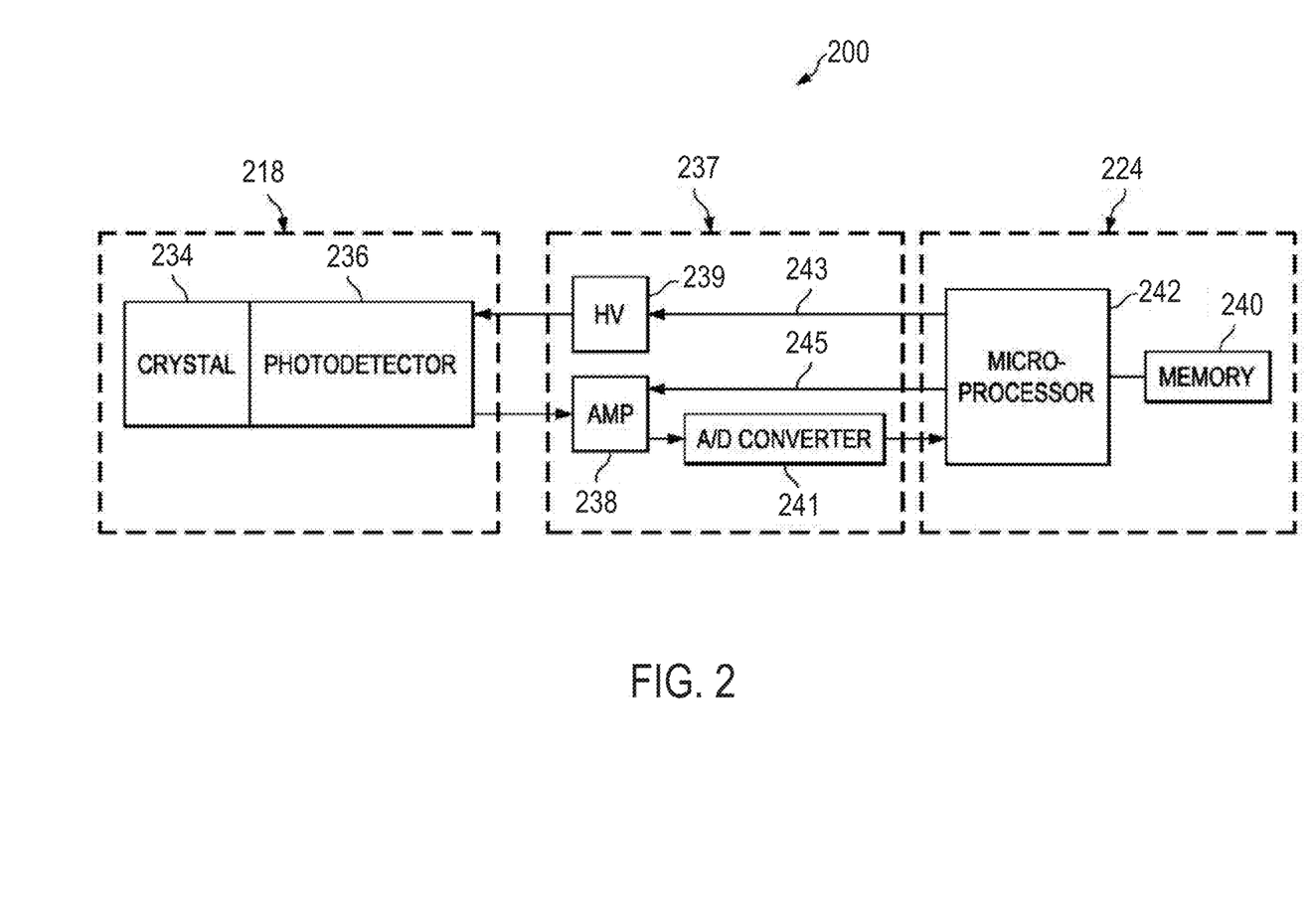
FIG. 2 is a diagram illustrating an example gamma ray detector system, in accordance with various aspects of the subject technology.

FIG. 2 is a diagram illustrating an example gamma ray detector system 200, in accordance with various aspects of the subject technology. The gamma ray detector system 200 includes a downhole gamma ray detector 218, electronics unit 237, and a processing unit 224. The gamma ray detector 218 may be part of a drilling assembly of a downhole tool for logging while drilling, or measuring while drilling operations (see FIG. 1A), or may be a wireline tool for logging an existing well (see FIG. 1B). The gamma ray detector system 200 may include one or more gamma ray detectors, e.g., 2, 3, 4, 5, 6, or more. Each gamma ray detector 218 counts gamma rays emitted naturally subsurface, but could also be used for other sources of gamma rays in the wellbore. The gamma ray detectors may be near an exterior of the logging tool and be spaced about a circumference. While multiple gamma ray detectors may be included, only one is explicitly presented here.

The one or more gamma ray detectors provide signals that scale the energy deposited in the detector by the gamma rays. The gamma ray detector 218 includes one or more scintillator crystals 234 for receiving the gamma rays that then create light emissions that influence an adjacent, optically-coupled photodetector 236, e.g., a photomultiplier tube (PMT). The gamma ray detector 218 is electrically coupled to an electronics unit 237. The electronics unit 237 may include an amplifier 238, a variable high voltage supply unit 239, and an analog-to-digital (A/D) converter 241. The high voltage supply unit 239 is coupled to and powers one or more of the gamma ray detectors 218. One power supply 239 may be used to power multiple gamma ray detectors. The high voltage supply 239 or supplies may be configured so that their output voltage can be adjusted by a controller or processor 242 as suggested by 243.

The electronics unit 237 may also include the one or more amplifiers 238 to modify the amplitude of the signals coming from the one or more gamma ray detectors 218. The amplifier 238 may be configured to be adjusted by a controller as suggested by 245. Finally, the electronics unit 237 includes the analog-to-digital (A/D) converter 241 to convert voltage signals to digital signals that may be passed to the processing unit 224. The electronics unit 237 is for converting and processing (e.g., adjusting the signal amplitude or adjusting the voltage supplied to the gamma ray detector) the signals including preparing digital signals.

The processing unit 224 includes one or more memories 240 associated with one or more processors, e.g., microprocessor 242. As is well understood, the one or more memories 240 together with the one or more processors 242 are operable to execute code or otherwise accomplish various functions as desired. The processor 242 may be configured to control the output voltage of the one or more variable high-voltage supplies 239 or the one or more amplifiers 238.

In some embodiments, the processing unit 224 may implement a gain control system for the one or more gamma ray detectors 218. The gain control system may include a control component and an analysis component. The control component may be configured to adjust the high voltage and electronic gains of detectors so as to keep measurement windows within the same channel number of the spectrum. The analysis component may be configured to analyze the information collected by the control component. Such analysis may include temperature correction of a gamma ray detector.

According to some embodiments, the gamma ray detector system 200 may be a gross counting gamma ray detector. The process of determining the gross count involves developing counts over a plurality of channels arranged in a spectrum. The gamma ray detector system 200 may be configured to develop count data over n-channels. Each channel represents a range of energy levels, e.g., three thousand electron volts (3 keV). The number of channels may vary for different applications; for example, n may be 10, 16, 20, 50, 64, 100, 128, 150, 200, 256, 400 or more, or any number in between. The counts stored in the channels forms a gamma spectrum. In some embodiments, the gamma ray detector system 200 may be a source-less system in that it may not include a radioactive source that emits a baseline known quantum of energy.

In some alternative implementations, spectrometer gain may be evaluated by processing spectra accumulated during a preceding time interval followed by adjustment of the detector high voltage based on the assessed gain. An effective gain assessment algorithm requires good counting statistics to make reliable evaluations. In some cases, this may be achieved using relatively short accumulation intervals for wireline logs. However, considerably longer accumulation intervals may be necessary for LWD tools because of reduced counting rates. When applied to LWD applications, such a backward-looking control scheme reacts slowly to changing operating conditions that can occur when tripping in or out, making short trips, or between alternating intervals of mud pumps on stages and off stages.

Aspects of the subject technology use periodic gain assessments obtained from accumulated spectra to calibrate a temperature-compensated model that controls the detector high voltage and makes the spectrometer gain control more reactive to changing operating conditions. For example, nominal operating high voltage and tool temperature information collected during routine shop thorium blanket calibration procedures can be stored in a memory (e.g., flash memory) of a downhole tool or sensor. In a borehole, this information is retrieved by the gain control system and combined with current tool temperature to calibrate the temperature-high voltage relationship when the tool is initialized to begin logging. While logging, periodic gain assessments from full-spectrum analyses of accumulated spectra automatically recalibrate the temperature-high voltage relationship as downhole conditions vary during the logging run. The temperature-high voltage relationship may be embodied in a gain control model (e.g., a mathematical model, a polynomial function, or the like).

The relationship between detector gain (high voltage control) and temperature is a result of the fact that the intensity of the light output from most scintillators used in gamma ray detectors varies with the temperature of the crystal used in the detectors. Each detector system with a scintillator crystal and photodetector (e.g., a photomultiplier) combination has a unique high-voltage/gain relationship and thus a unique temperature-high voltage relationship. However, over time, aging of the photodetector may alter its transformation of detected scintillations into electrical pulses. Thus, the temperature-high voltage relationship varies over time as the photodetector ages. Accordingly, redefinitions of the correlation between temperature and high voltage are desirable from time to time during the operational life of a detector or when replacing damaged components.

Aspects of the subject technology address these technical problems by providing a gain control system configured to calibrate a detector not only during downhole operations, but also throughout the lifetime of the detector. Aspects of the subject technology further enable a gain control system to react more rapidly to changing logging conditions that routinely occur during LWD operations. Some aspects of the subject technology are developed primarily for natural gamma ray spectroscopy measurements intended to make measurements of formation thorium, uranium, and potassium, while other aspects of the subject technology are directed to work with scintillator-based total gamma ray tools.

Figure 3:
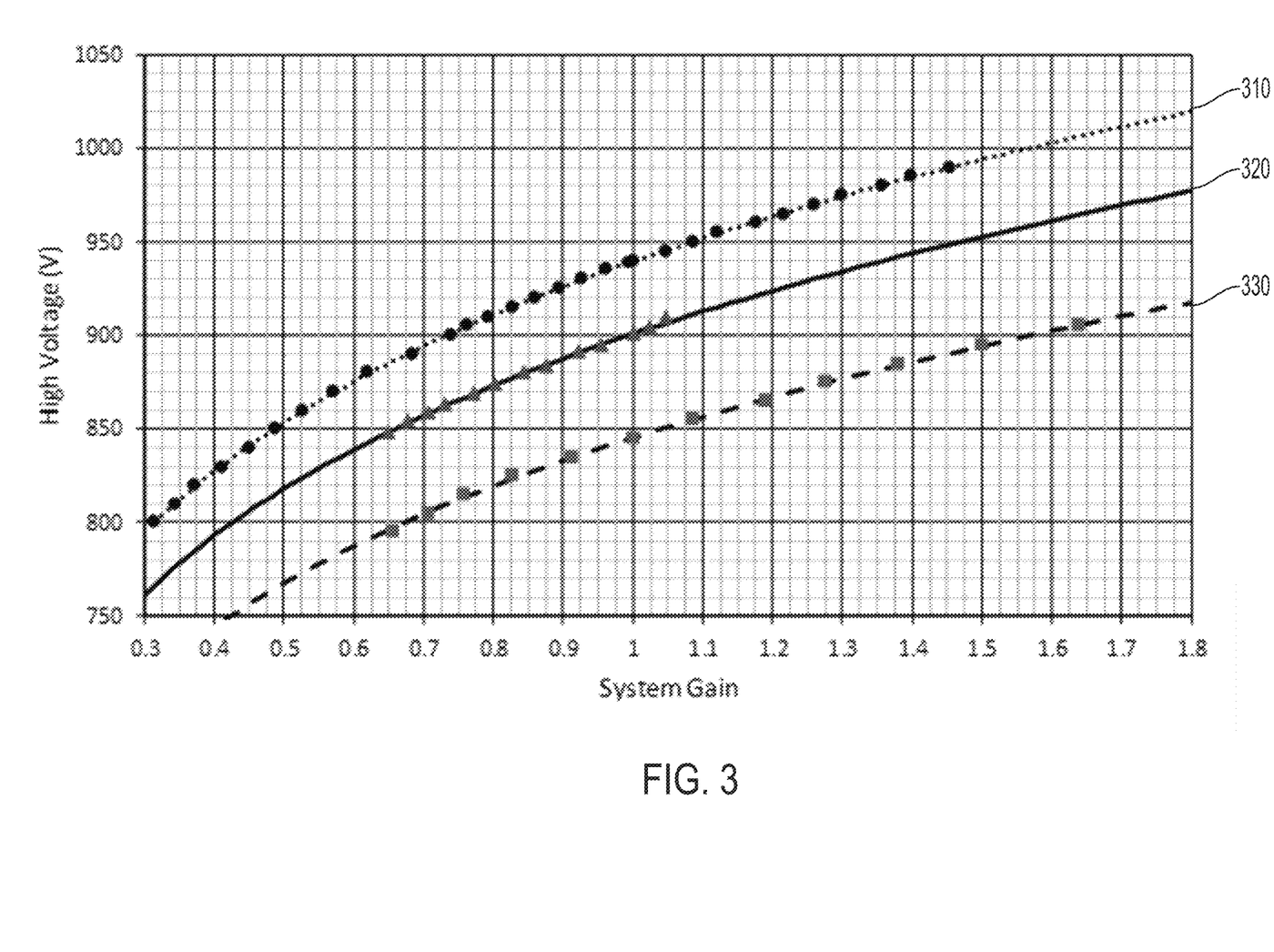
FIG. 3 is a chart showing a relationship between gamma ray detector high voltage and system gain, in accordance with various aspects of the subject technology.

FIG. 3 is a chart showing a relationship between gamma ray detector high voltage and system gain, in accordance with various aspects of the subject technology. Line 310, formed by a series of data points, shows an exponential correspondence between detector high voltage versus system gain from a series of bench top laboratory measurements performed at room temperature. For the particular model of gamma ray detector measured, a room temperature operating voltage of 939 volts produces the nominal, desired system gain of 1. Stated another way, $HV=Ag^x$, where the high voltage, HV, is given by A times the system gain, g, raised to the x power. The coefficient A is the nominal high voltage for a system gain of 1. Combinations of different scintillator crystals and photodetectors exhibit the same exponential relationship, but they are offset from each other, i.e., the A coefficient is different, but the exponent, x, is the same.

FIG. 3 also includes data from two additional gamma ray detectors of the same type (scintillator and photodetector combination). Line 320 and line 330 are exponential functions involving the same exponent, x, as line 310, but with different coefficients, A. Data from exponential functions like the ones shown in FIG. 3 may be useful predictors of high voltage changes required to obtain a desired gain of 1.

Figure 4:
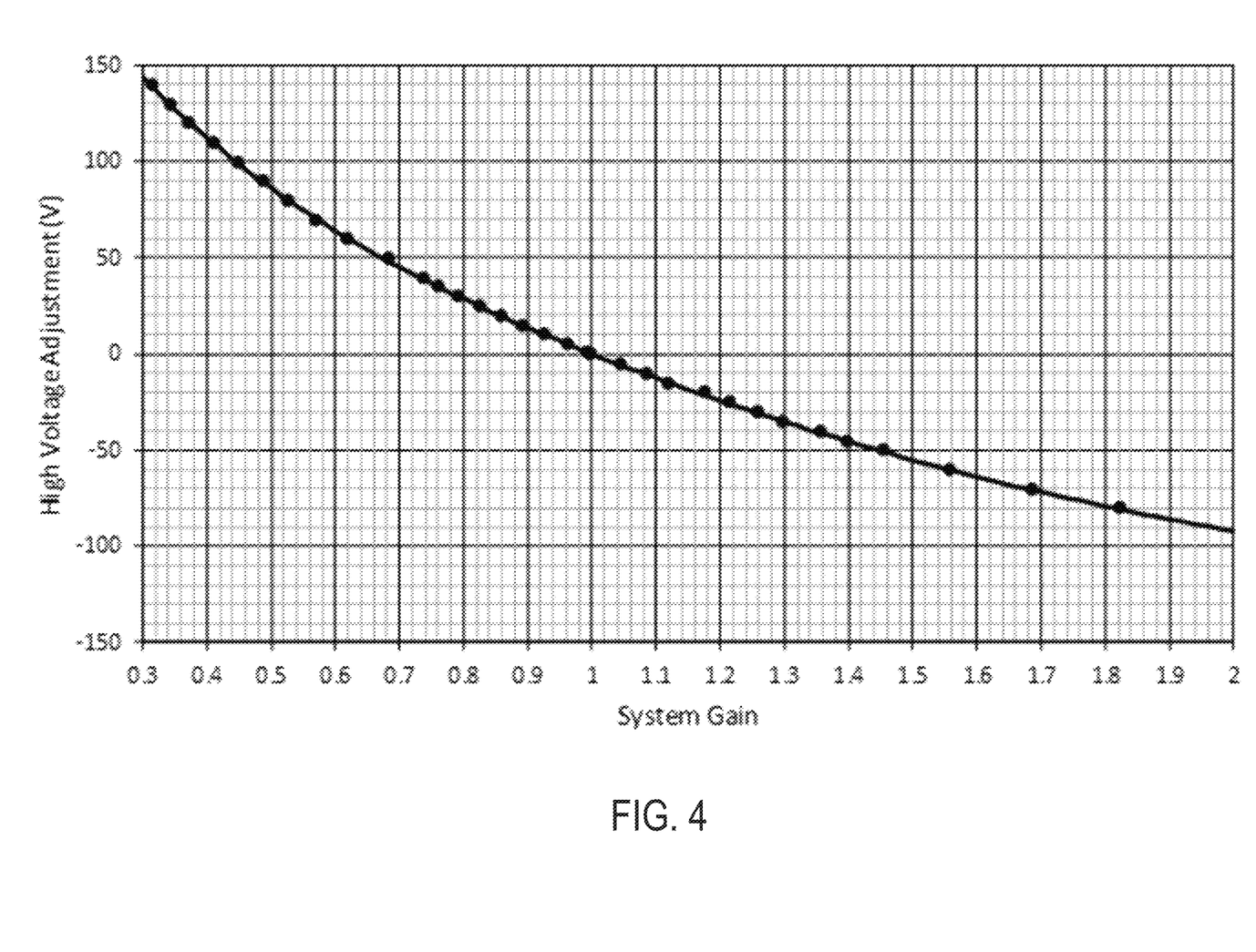
FIG. 4 is a chart showing a relationship between required high voltage adjustment and system gain, in accordance with various aspects of the subject technology.

FIG. 4 is a chart showing a relationship between required high voltage adjustment and system gain, in accordance with various aspects of the subject technology. FIG. 4 shows the required high voltage adjustment as a function of system gain derived from the data points represented in line 310 of FIG. 3.

All of the data shown in FIG. 3 were obtained at room temperature operating conditions. When the detector operates in a borehole, its temperature tends to approach ambient conditions over time. When detector temperature increases, the light output of the scintillator decreases and larger high voltages must be applied to the photodetector (e.g., the PMT) to maintain the desired system gain and vice versa.

Figure 5:
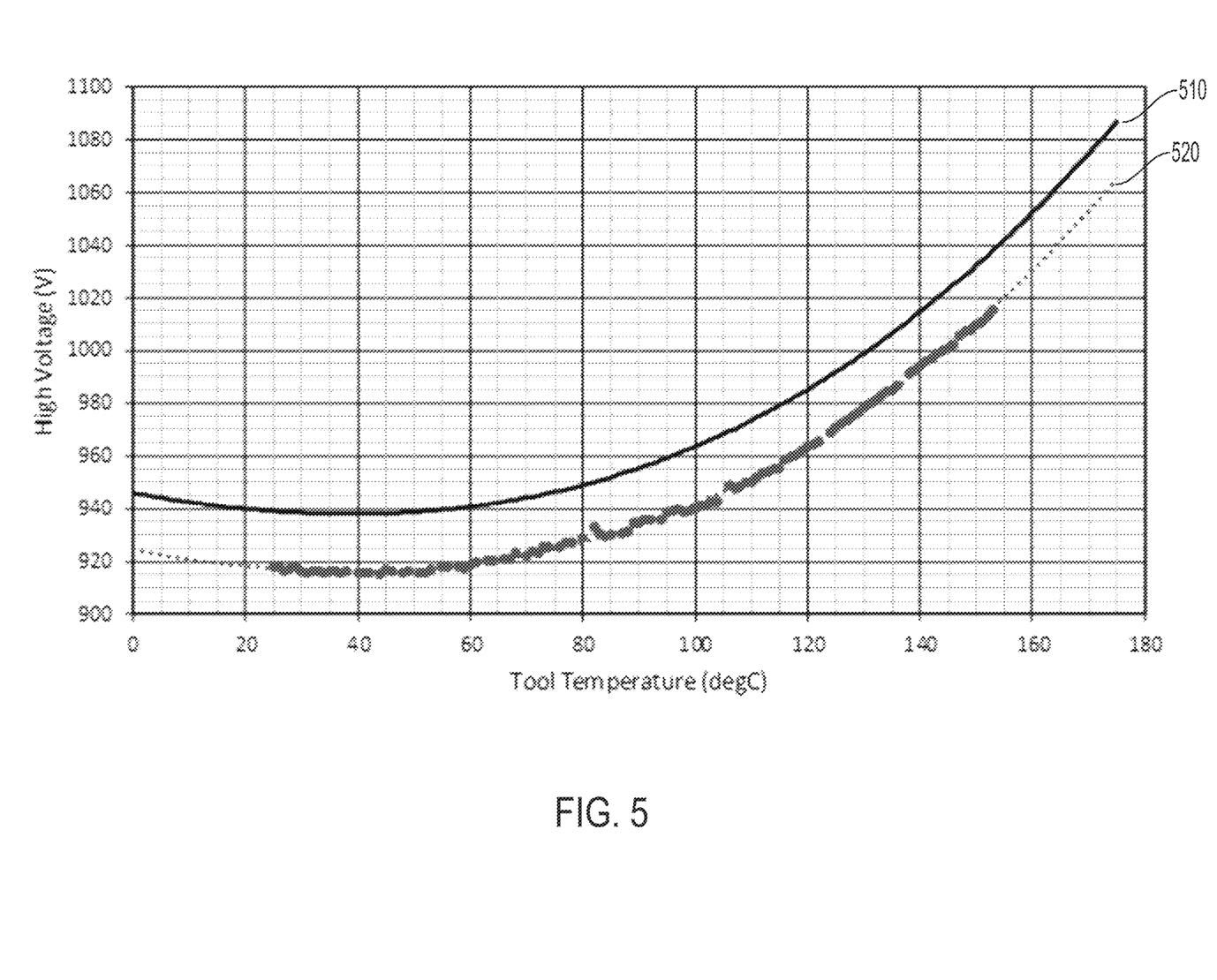
FIG. 5 is a chart showing a relationship between high voltage and tool temperature, in accordance with various aspects of the subject technology.

FIG. 5 is a chart showing a relationship between high voltage and tool temperature, in accordance with various aspects of the subject technology. The data points of line 520 in FIG. 5 show data obtained with a LWD spectral gamma ray tool inside an oven where the tool temperature came from a sensor proximate to the detector. A polynomial function represented by line 520 describes the data over the working temperature range for the downhole tool design. Different functions may be required for tools whose designs are different than the one referenced here. Tools of the same design tend to exhibit similar high voltage versus tool temperature relationships; small deviations may occur because the thermal coupling between the temperature sensor and the detector itself may vary slightly from tool to tool. Even with identical thermal coupling between the temperature sensor and the detector, different tools of the same type will follow relationships that are offset from one another because their nominal operating voltages at room temperature are different. The function represented by line 510 in FIG. 5 illustrates such a case.

In some scenarios, it may not be practical to characterize individual high voltage versus temperature relationships for every tool that is manufactured. However, aspects of the subject technology enable the characterization of a relationship for a reference tool and the use of the relationship in a self-calibrating mode for other tools of the same design. The idea is to change the zeroth order coefficient (zero offset term) of the high voltage-temperature polynomial for a given tool based on its nominal high voltage at room temperature or ambient surface conditions. When the tool is operating in a borehole, the offset term of the high voltage-tool temperature relationship can be recalibrated according to periodic assessments of system gain from a full-spectrum analysis of accumulated spectra. Doing so compensates for detector aging effects during a long in-hole run as well as minor thermal coupling differences between the temperature sensor and detector that may occur from tool to tool. Recalibration of the offset term is achieved with knowledge of any valid operating point on the high voltage-tool temperature relationship, e.g., $$d = HV_o - (aT_o^3 + bT_o^2 + cT_o),$$

where d is the recalibrated zero offset, $HV_o$ is the operating high voltage, $T_o$ is the operating temperature, and a, b, and c are coefficients from the reference high voltage-temperature relationship.

Various aspects of the subject technology relate to operating a tool with a self-calibrating temperature-compensated gain control system inside a wellbore. Nominal high voltage and measured tool temperature from a routine thorium blanket shop calibration procedure may be used to calibrate the zero offset of the high voltage-temperature relationship. Then, operations can begin inside a borehole and the tool's current temperature and the calibrated offset from the shop calibration procedure determine a beginning photodetector (e.g., PMT) high voltage value. This marks the beginning of an operational loop consisting of collecting a spectrum, accumulating spectra together with averages of tool temperature and set high voltage during an accumulation interval.

If the accumulation criteria are not satisfied, the loop returns to set high voltage step. Criteria for ending a spectrum accumulation interval may include accumulating a minimum number of events (gamma ray counts) and/or a minimum time interval. When the accumulation criteria are satisfied, the system assesses the detector gain by performing a full-spectrum weighted least-squares analysis on the accumulated spectrum. Next, the system calculates an adjustment to the average high voltage (HV) setting during the accumulation interval as a function of the system gain from the gain assessment. After that, the system recalibrates the high voltage-temperature relationship zero offset based on the adjusted average HV setting and the average tool temperature during the accumulation interval. Then, a new accumulation interval begins by using the newly calibrated high voltage-temperature relationship zero offset with the current tool temperature to set the high voltage for the next spectrum measurement.

Figure 6A:
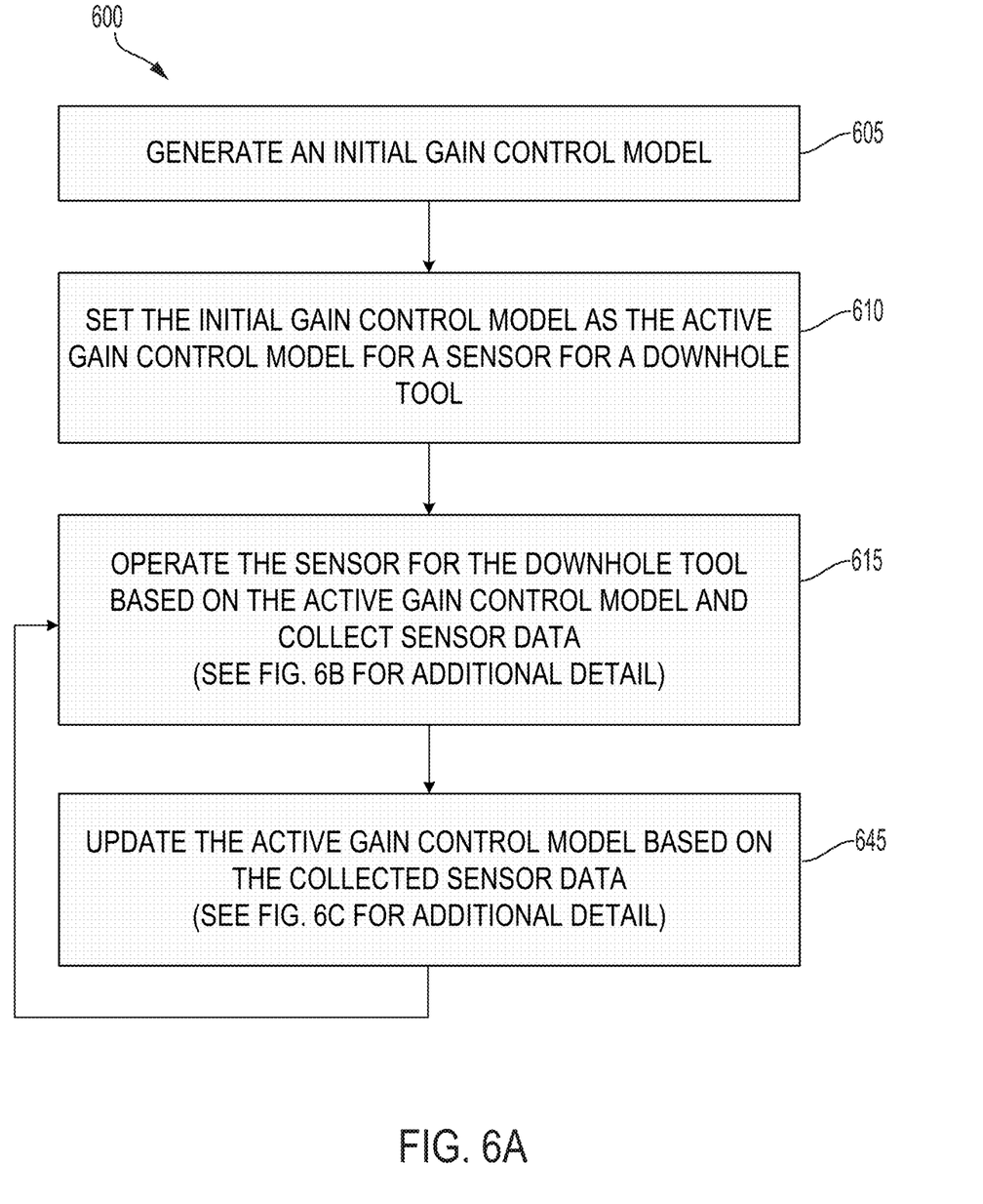
FIGS. 6A-6C are flowcharts illustrating example methods for adjusting a high voltage setting for a sensor, in accordance with some examples.
Figure 6B:
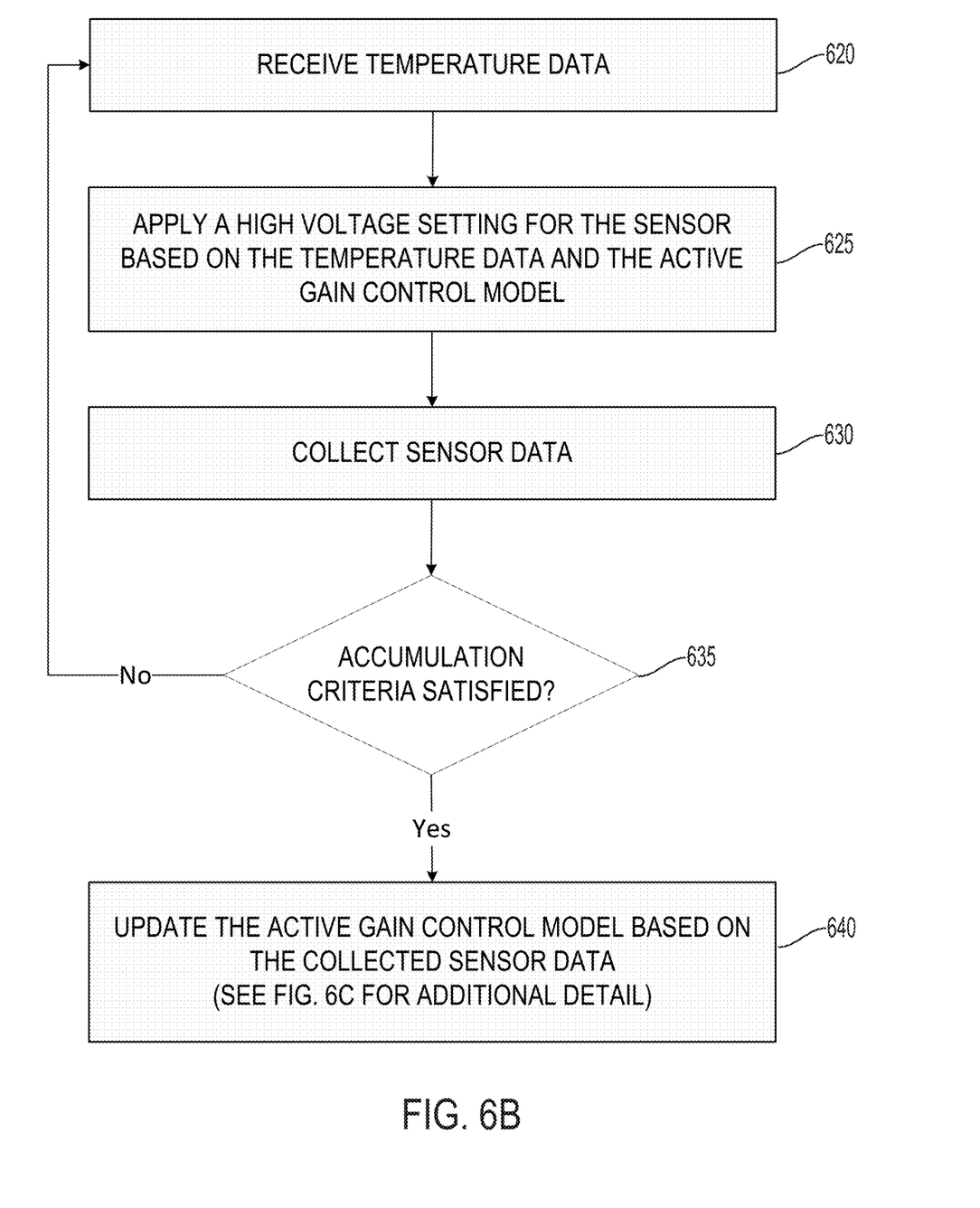
Figure 6C:
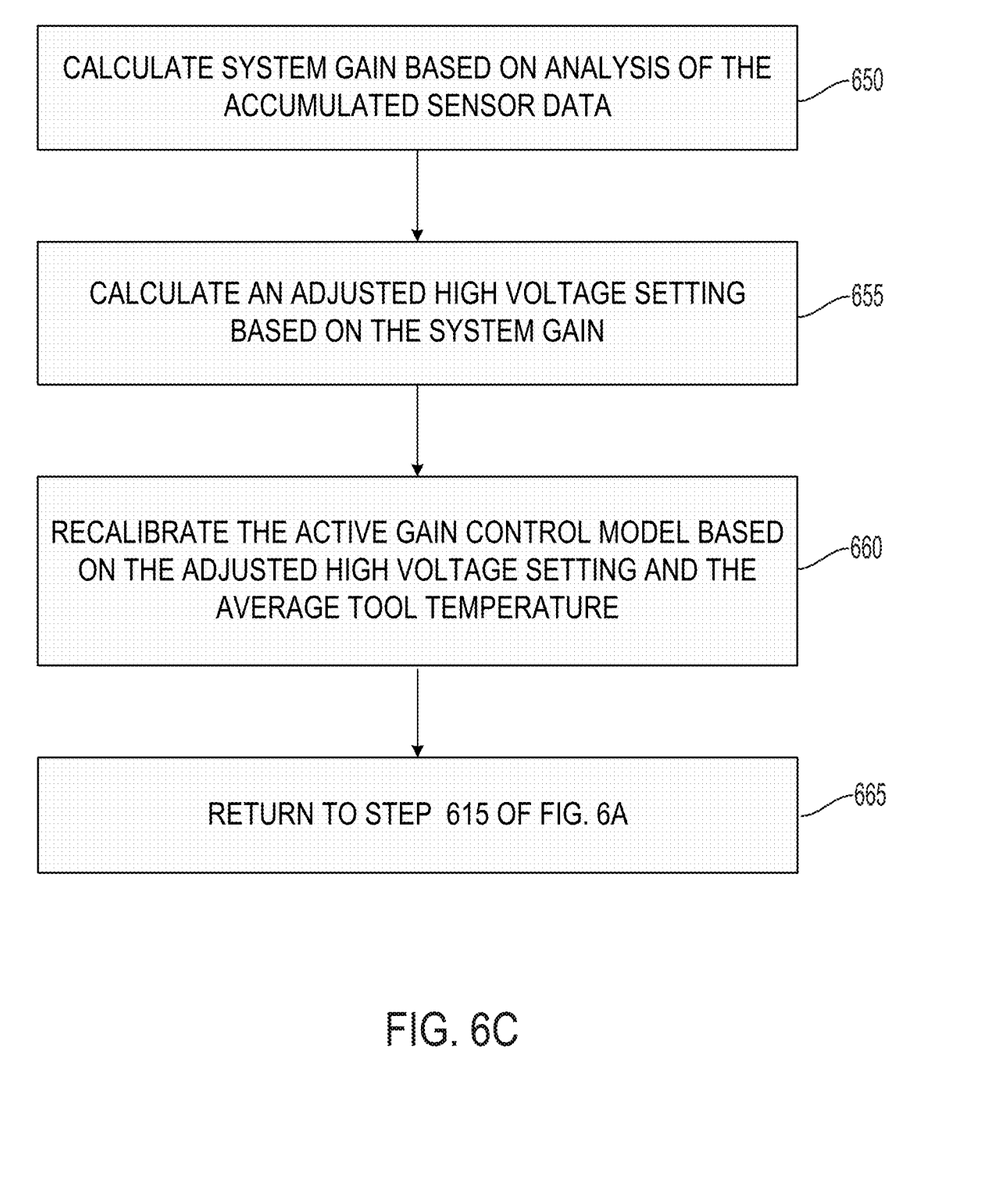

FIGS. 6A-6C are flowcharts illustrating example methods for adjusting a high voltage setting for a sensor, in accordance with some examples. For the sake of clarity, the methods are described with respect to a system. The system may include a gain control system and/or other system. The system may be implemented in one or more geographic locations including but not limited to, on the downhole tool, in the wellbore, at the drilling platform, or at a remote site. The steps outlined herein are exemplary and can be implemented in any combination thereof, including combinations that exclude, add, or modify certain steps.

FIG. 6A shows a method 600 for operating a sensor for a downhole tool based on an active gain control model and updating the active gain control model over time. The sensor, in some cases, may be a gamma ray detector configured to collect spectral data.

At step 605, a first system may be configured to generate an initial gain control model for the sensor. The gain control model may specify a high voltage-temperature (HV-T) relationship for the sensor in the form of a polynomial function or other representation. The first system may generate the initial gain control model at a location away from where the sensor and the downhole tool will eventually be deployed. For example, the initial gain control model may be generated at a remote laboratory or machine shop site. Furthermore, the initial gain control model may be generated using the same sensor as will be deployed or a different sensor unit of the same type (e.g., a reference unit of the same model or the same scintillator-photodetector combination).

The initial gain control model may be transmitted to or loaded on the sensor, the gain control system associated with the sensor, or the downhole tool on which the sensor is installed. At step 610, the gain control system may set the initial gain control model as the active gain control model and, at step 615, operate the sensor for the downhole tool based on the active gain control model. During borehole operation in accordance with the active gain control model, sensor data is collected from the sensor.

As will be discussed in further detail with respect to FIG. 6C, based on the collected data, the gain control system may update the active gain control model. Once the active gain control model is updated, the process may return to step 615 and continue operation. As a result, the gain control model being applied to the sensor may continually be updated over time. Furthermore, since the gain control model specifies a high voltage-temperature (HV-T) relationship for the sensor and not merely a static setting, the sensor is able to quickly react to changes in tool temperatures that occur in between model updates.

To help illustrate, FIG. 6B shows steps associated with the operation of the sensor based on the active gain control model in greater detail. As noted above, the active gain control model specifies a high voltage-temperature (HV-T) relationship for the sensor. This relationship can be illustrated by line 510 of FIG. 5 and it is evident that a high voltage setting may be identified for a given temperature in accordance with line 510. At step 620, the gain control system receives temperature data for the sensor and/or the downhole tool. The gain control system identifies a high voltage setting based on the temperature data and the active gain control model and applies it to the sensor at step 625.

During operation, sensor data (e.g., spectral data for a gamma ray detector) is collected at step 630. Other information such as temperature readings and the high voltage settings used may similarly be recorded and later used to compute additional metrics (e.g., average temperatures). The gain control system may continue to operate under the existing gain control model and continue to collect sensor data until a set of accumulation criteria is satisfied. The accumulation criteria may be a threshold number of events, a threshold length of time, another metric, or a combination of these or other metrics.

If the accumulation criteria are not satisfied, the gain control system continues to adjust the high voltage setting for the sensor based on a current temperature reading and the existing gain control model. Once the accumulation criteria are met, the gain control system can update the active gain control model based on the collected data.

FIG. 6C shows steps associated updating the active gain control model, in accordance with various aspects of the subject technology. At step 650, the gain control system calculates system gain based on analysis of the accumulated sensor data. The gain for the sensor may be assessed by performing a full-spectrum weighted least-squares analysis on the accumulated sensor data (e.g., spectral data for a gamma ray detector).

Using the system gain, the gain control system calculates an adjusted high voltage setting at step 655. For example, based on the chart of FIG. 4 and the calculated system gain, the gain control system is able to determine a high voltage adjustment. Based on the adjusted high voltage setting and the averaged tool temperature experience during the previous accumulation phase, the gain control system is able to recalibrate the active gain control model at operation 660. Recalibrating the active gain control model may include, for example, identifying a new offset for the active gain control model.

Once the active gain control model is recalibrated or otherwise updated, the process may return to step 615 of FIG. 6A where operation for the sensor can be based on the modified gain control model.

Figure 7:
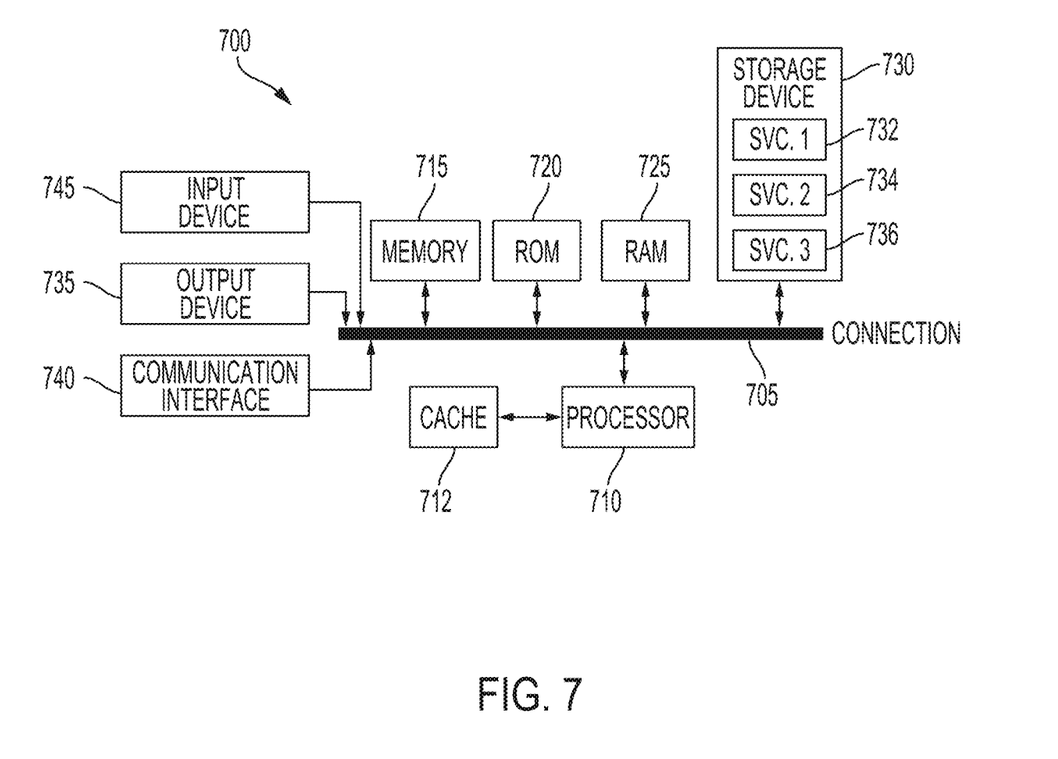
FIG. 7 is a schematic diagram of an example computing device architecture, in accordance with some examples.

FIG. 7 illustrates an example computing device architecture 700 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 7 illustrates an example computing device architecture 700 of a computing device which can implement the various technologies and techniques described herein. For example, the computing device architecture 700 can implement a gain control system or control system. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Numerous examples are provided herein to enhance understanding of the present disclosure. A specific set of statements are provided as follows.

Statement 1: a system comprising a gamma ray detector for a downhole tool and a gain control component configured to adjust voltage for the gamma ray detector. The gain control component comprises at least one computer-readable storage medium having stored therein instructions which, when executed by the gain control component, cause the gain control component to identify an active gain control model for the gamma ray detector; receive temperature data for the downhole tool; apply a high voltage setting for the gamma ray detector based on the temperature data and the active gain control model; collect gamma ray spectral data from the gamma ray detector operating in a wellbore using the high voltage setting; and update the active gain control model based on the gamma ray spectral data.

Statement 2: the system of statement 1, wherein the gamma ray detector comprises a scintillator and a photodetector.

Statement 3: the system of statements 1 through 2, wherein the photodetector is a photomultiplier tube.

Statement 4: the system of statements 1 through 3, the at least one computer-readable storage medium storing additional instructions which, when executed by the gain control component, cause the gain control component to calculate an average tool temperature over a period of time; calculate system gain based on the gamma ray spectral data collected over the period of time; calculate an adjusted high voltage setting based on the system gain; and recalibrate the active gain control model based on the adjusted high voltage setting and the average tool temperature.

Statement 5: the system of statements 1 through 4, the at least one computer-readable storage medium storing additional instructions which, when executed by the gain control component, cause the gain control component to determine the period of time based on a set of accumulation criteria.

Statement 6: the system of statements 1 through 5, wherein the set of accumulation criteria comprises at least one of a threshold number of events or a threshold length of time.

Statement 7: the system of statements 1 through 6, wherein the active gain control model specifies a high voltage-temperature (HV-T) relationship for the gamma ray detector.

Statement 8: the system of statements 1 through 7, wherein the active gain control model is a polynomial function.

Statement 9: a method comprising identifying an active gain control model for a first sensor for a downhole tool, wherein the first sensor is temperature sensitive; receiving temperature data for the downhole tool; applying a high voltage setting for the first sensor based on the temperature data and the active gain control model; collecting sensor data from the first sensor operating in a wellbore using the high voltage setting; and updating the active gain control model based on the sensor data.

Statement 10: the method of statement 9, further comprising generating an initial gain control model and setting the initial gain control model as the active gain control model for the first sensor.

Statement 11: the method of statements 9 through 10, wherein the initial gain control model is generated at a secondary site based on a second sensor of a same type as the first sensor for the downhole tool.

Statement 12: the method of statements 9 through 11, wherein the first sensor is a gamma ray detector and the sensor data collected from the first sensor comprises gamma ray spectral data.

Statement 13: the method of statements 9 through 12, further comprising calculating an average tool temperature over a period of time; calculating system gain based on the sensor data collected over the period of time; calculating an adjusted high voltage setting based on the system gain; and recalibrating the active gain control model based on the adjusted high voltage setting and the average tool temperature.

Statement 14: the method of statements 9 through 13, further comprising determining the period of time based on a set of accumulation criteria comprising at least one of a threshold number of events or a threshold length of time.

Statement 15: the method of statements 9 through 14, wherein recalibrating the active gain control model comprises identifying a new offset for the active gain control model.

Statement 16: the method of statements 9 through 15, wherein the active gain control model specifies a high voltage-temperature (HV-T) relationship for the first sensor.

Statement 17: the method of statements 9 through 16, wherein the active gain control model is a polynomial function.

Statement 18: a non-transitory computer-readable storage medium comprising instructions stored on the non-transitory computer-readable storage medium, the instructions, when executed by one more processors, cause the one or more processors to identify an active gain control model for a sensor for a downhole tool; receive temperature data for the downhole tool; adjust a high voltage setting for the sensor based on the temperature data and the active gain control model; record, for an accumulation period of time, sensor data from the sensor operating in a wellbore using the high voltage setting; and update the active gain control model based on the sensor data.

Statement 19: the non-transitory computer-readable storage medium of statement 18, further comprising instructions stored thereon which, when executed by the one more processors, cause the one or more processors to determine an average tool temperature over a period of time; determine system gain based on the sensor data collected over the period of time; determine an adjusted high voltage setting based on the system gain; and recalibrate the active gain control model based on the adjusted high voltage setting and the average tool temperature.

Statement 20: the non-transitory computer-readable storage medium of statements 18 through 19, further comprising instructions stored thereon which, when executed by the one more processors, cause the one or more processors to determine the accumulation period of time based on a set of accumulation criteria comprising at least one of a threshold number of events or a threshold length of time.

The disclosures shown and described above are only examples. Even though numerous characteristics and advantages of the present technology have been set forth in the foregoing description, together with details of the structure and function of the present disclosure, the disclosure is illustrative only, and changes can be made in the detail, especially in matters of shape, size and arrangement of the parts within the principles of the present disclosure to the full extent indicated by the broad general meaning of the terms used in the attached claims. It will therefore be appreciated that the embodiments described above can be modified within the scope of the appended claims.

What is claimed is:

1. A system comprising:
   a gamma ray detector for a downhole tool; and
   a gain control component configured to adjust voltage for the gamma ray detector, the gain control component comprising at least one computer-readable storage medium having stored therein instructions which, when executed by the gain control component, cause the gain control component to:
     identify an active gain control model for the gamma ray detector;
     receive temperature data for the downhole tool;
     apply a high voltage setting for the gamma ray detector based on the temperature data and the active gain control model;
     collect gamma ray spectral data from the gamma ray detector operating in a wellbore using the high voltage setting; and
     update the active gain control model based on the gamma ray spectral data.

2. The system of claim 1, wherein the gamma ray detector comprises a scintillator and a photodetector.

3. The system of claim 2, wherein the photodetector is a photomultiplier tube.

4. The system of claim 1, the at least one computer-readable storage medium storing additional instructions which, when executed by the gain control component, cause the gain control component to:
   calculate an average tool temperature over a period of time;
   calculate system gain based on the gamma ray spectral data collected over the period of time;
   calculate an adjusted high voltage setting based on the system gain; and
   recalibrate the active gain control model based on the adjusted high voltage setting and the average tool temperature.

5. The system of claim 4, the at least one computer-readable storage medium storing additional instructions which, when executed by the gain control component, cause the gain control component to determine the period of time based on a set of accumulation criteria.

6. The system of claim 5, wherein the set of accumulation criteria comprises at least one of a threshold number of events or a threshold length of time.

7. The system of claim 1, wherein the active gain control model specifies a high voltage-temperature (HV-T) relationship for the gamma ray detector.

8. The system of claim 1, wherein the active gain control model is a polynomial function.

9. A method comprising:
   identifying an active gain control model for a first sensor for a downhole tool, wherein the first sensor is temperature sensitive;
   receiving temperature data for the downhole tool;
   applying a high voltage setting for the first sensor based on the temperature data and the active gain control model;
   collecting sensor data from the first sensor operating in a wellbore using the high voltage setting; and
   updating the active gain control model based on the sensor data.

10. The method of claim 9, further comprising generating an initial gain control model and setting the initial gain control model as the active gain control model for the first sensor.

11. The method of claim 10, wherein the initial gain control model is generated at a secondary site based on a second sensor of a same type as the first sensor for the downhole tool.

12. The method of claim 9, wherein the first sensor is a gamma ray detector and the sensor data collected from the first sensor comprises gamma ray spectral data.

13. The method of claim 9, further comprising:
   calculating an average tool temperature over a period of time;
   calculating system gain based on the sensor data collected over the period of time;
   calculating an adjusted high voltage setting based on the system gain; and
   recalibrating the active gain control model based on the adjusted high voltage setting and the average tool temperature.

14. The method of claim 13, further comprising determining the period of time based on a set of accumulation criteria comprising at least one of a threshold number of events or a threshold length of time.

15. The method of claim 13, wherein recalibrating the active gain control model comprises identifying a new offset for the active gain control model.

16. The method of claim 9, wherein the active gain control model specifies a high voltage-temperature (HV-T) relationship for the first sensor.

17. The method of claim 9, wherein the active gain control model is a polynomial function.

18. A non-transitory computer-readable storage medium comprising
  instructions stored on the non-transitory computer-readable storage medium, the instructions, when executed by one more processors, cause the one or more processors to:
  identify an active gain control model for a sensor for a downhole tool;
  receive temperature data for the downhole tool;
  adjust a high voltage setting for the sensor based on the temperature data and the active gain control model;
  record, for an accumulation period of time, sensor data from the sensor operating in a wellbore using the high voltage setting; and
  update the active gain control model based on the sensor data.

19. The non-transitory computer-readable storage medium of claim 18, further comprising instructions stored thereon which, when executed by the one more processors, cause the one or more processors to:
  determine an average tool temperature over a period of time;
  determine system gain based on the sensor data collected over the period of time;
  determine an adjusted high voltage setting based on the system gain; and
  recalibrate the active gain control model based on the adjusted high voltage setting and the average tool temperature.

20. The non-transitory computer-readable storage medium of claim 18, further comprising instructions stored thereon which, when executed by the one more processors, cause the one or more processors to determine the accumulation period of time based on a set of accumulation criteria comprising at least one of a threshold number of events or a threshold length of time.

* * * * *